US007685038B2

(12) United States Patent
Stevens et al.

(10) Patent No.: US 7,685,038 B2
(45) Date of Patent: Mar. 23, 2010

(54) METHOD AND SYSTEM FOR BLOCK TRADING OF SECURITIES

(75) Inventors: Ross L. Stevens, New York, NY (US); George S. Corey, Jr., Westport, CT (US); Vkad Portnoy, New York, NY (US)

(73) Assignee: Bank of America Corporation, Charlotte, NC (US)

( * ) Notice: Subject to any disclaimer, the term of this patent is extended or adjusted under 35 U.S.C. 154(b) by 1303 days.

(21) Appl. No.: 10/711,889

(22) Filed: Oct. 12, 2004

(65) Prior Publication Data

US 2005/0246261 A1    Nov. 3, 2005

Related U.S. Application Data

(60) Provisional application No. 60/566,708, filed on Apr. 30, 2004.

(51) Int. Cl.
*G06Q 40/00* (2006.01)
(52) U.S. Cl. ........................................................ 705/35
(58) Field of Classification Search .................... 705/35
See application file for complete search history.

(56) References Cited

U.S. PATENT DOCUMENTS

| | | | | |
|---|---|---|---|---|
| 2002/0004776 | A1* | 1/2002 | Gladstone | 705/37 |
| 2002/0055901 | A1* | 5/2002 | Gianakouros et al. | 705/37 |
| 2002/0128958 | A1 | 9/2002 | Slone | |
| 2003/0120585 | A1* | 6/2003 | Rosenblatt | 705/37 |
| 2004/0128261 | A1* | 7/2004 | Olavson et al. | 705/400 |
| 2004/0210511 | A1* | 10/2004 | Waelbroeck et al. | 705/37 |
| 2008/0015974 | A1* | 1/2008 | Balabon | 705/37 |

OTHER PUBLICATIONS

Vartanig G. Vartan. New York Times Late Edition. Wall Street Mergers Gather Momentum. Jan. 10, 1982.*
James Angel; Gary Gastineau; Clifford Weber. Reducing the Market Impact of Large Stock Trades. Journal of Portfolio Management. vol. 24, issue 1.*
Ivy Schmerken. Volatility Shakes Up Block Trading. Wall Street and Technology. Mar./Apr. 2009. vol. 5, p. 19.*
Stevens et al., "International Application No. PCT/US05/14663", *Written Opinion*, (Jan. 5, 2006).
Stevens et al., "International Application No. PCT/US05/14663", *International Search Report*, (Jan. 5, 2006).
Bank of America Corporation, European Supplementary Search Report, issued in corresponding European Patent Application No. 05472137.2, May 4, 2009.

* cited by examiner

*Primary Examiner*—Hani Kazimi
*Assistant Examiner*—John O Preston
(74) *Attorney, Agent, or Firm*—Michael A. Springs; Moore & Van Allen PLLC

(57) ABSTRACT

Method and system for block trading of securities. Embodiments of the present invention can provide an automated dealer system that formulates customized, risk-controlled, two-sided indicative quotations for block quantities of a security. A quotation can be delivered to requesting counterparties via a secured network or Web-based platform. The system can also allow counterparties to submit orders for block trades based on the customized quotations. A customized quote can be based on the size of the block and historical characteristics of the security. The quoting service can be customized to take into account a minimum premium to be charged for a trade, profitability considerations discounts, and time considerations.

44 Claims, 4 Drawing Sheets

METHOD AND SYSTEM FOR BLOCK TRADING OF SECURITIES

CROSS-REFERENCE TO RELATED APPLICATION

This application claims priority from provisional patent application No. 60/566,708 filed Apr. 30, 2004 by the inventors hereof, the entire disclosure of which is incorporated herein by reference.

BACKGROUND OF INVENTION

There exist many methods of trading securities through automated systems. These systems may be operated by exchanges, automated trading systems ("ATS's") and electronic communications networks ("ECN's"). These systems bring counterparties together largely by publishing firm prices ("quotes") by market makers, exchange specialists, and institutional customers. These prices are usually displayed in what is known as the Consolidated Quote System ("CQS") or National Market System ("NMS") or on other private networks, but in either case are broadly disseminated to multiple parties simultaneously, as well as carried by market data vendors that also broadly display such prices.

By and large, these systems have been effective at posting and executing orders of relatively small size. Participants with larger orders ("blocks") are disincented from using such systems, however, because of the likelihood that such broad, public display of large orders would tend to have negative market impact, and subject the holder of such orders to the risk that prices will move against them.

This disincentive has become particularly acute with the move to decimalization in the last few years, which has had a marked effect on trading behavior. A reduction in the amount of liquidity that participants are willing to show (display) as a result of decimalization has been observed in U.S. securities markets. For example, it has been observed that participants who do use existing automated systems for large orders are forced to break up the order into smaller portions, in an attempt to remain anonymous both as to their identity and as to the size of their true orders. Thus an institutional customer seeking to buy or sell a large block of stock (e.g. 100,000 shares) would not want to publicly advertise this in the form of a public quotation on an exchange or via a market maker's quotation, nor would they want to post an order of that size on an ECN, which also would be displayed in the CQS or NMS for all participants to observe. Instead, such a customer must often break the order up into many individual lots and post them in multiple venues or feed them into the market slowly over a period of time so as not to "move the market" to their detriment. This raises the cost of handling such orders, and inhibits the process of filling the entire order at a single, known price quickly and efficiently.

As a result, at least some larger orders are submitted to an exchange floor, to be "worked" by a floor broker in a manual fashion requiring a high degree of human interactivity and judgment, with its attendant problems such as "information leakage," human error and higher handling costs. In the alternative, such larger orders also may be "shopped" to dealers in the over-the-counter ("OTC") market (also called market makers or "block positioners") who often are willing to commit their own capital to the order, or assemble other counterparties away from an exchange floor, helping the customer receive an acceptable price. This too is largely a manual process, requiring dealers to negotiate verbally with the customer or other counterparties, and also may be subject to information leakage and error.

From the dealer's perspective, this process also is difficult to manage because of the risk that always is involved when a dealer commits its own capital to a transaction. In order to manage this risk effectively, the trader committing this capital must synthesize many pricing factors during the negotiation in order to establish the ultimate transaction price that is not only acceptable to all parties, but also consistent with a variety of risk parameters that may be established by a dealer when going "at risk" by committing its own capital.

At the same time, because of the collapse of the typical displayed bid-ask spread resulting from decimalization and other regulatory changes in the past few years, those dealers who are willing to commit their own capital at a price have reduced the amount of capital (liquidity) they may be willing to commit, whether it is in the form of their proprietary quote in the public CQS or NMS system or even when negotiating in a manual process when dealing with a customer.

SUMMARY OF INVENTION

Embodiments of the present invention can provide an automated dealer system that formulates customized, risk-controlled, two-sided indicative quotations for block quantities of a security. Each indicative quotation reflects a valuation and likely price at which a dealer may be willing to trade in a large block. A quotation can be delivered to requesting counterparties via a secured network or Web-based platform. A system employing the invention can also optionally allow counterparties to submit orders to execute block trades based on a customized quotation.

In some embodiments, a block trade of a security is facilitated by a dealer system formulating a customized quote for the block in response to a request from a prospective counterparty or counterparties. The customized quote can be provided by a quote service and can be based on the size of the block and at least one historical characteristic of the security. Historical characteristics for securities can include a historical spread, volatility, liquidity, or other characteristics. The customized quote can then be delivered via network or similar means to prospective counterparties, and an order or orders can be accepted to trade the block of the security based on the customized quote. The trade can be accomplished via a trade processing system that executes the trades as needed. Either the request for the quote or the subsequent request for the trade, or both can be verified against a plurality of business logic rules.

In some embodiments, a quoting service algorithm can include running a regression analysis to establish slope and intercept values for a pricing function. Historical characteristics for the security are also calculated and coefficients can be determined based on a profitability simulation. The customized quotation can be produced from the pricing function using the slope and intercept values, the coefficients, the block quantity, and the historical characteristics of the security. The quoting service can be customized to take into account a minimum premium to be charged for a trade, client specific profitability, which can be represented by a constant, as well as other factors and parameters.

In some embodiments, the basic algorithm produces a raw quote, and the final, customized quote is determined from the raw quote by applying an adjustment based on a time of day, and/or by applying a discount based on the dealer's current position in the selected security. Positions can be maintained by a position server, and other servers and systems can be interconnected with the system to update books and records, and communicate trade information to the appropriate exchange and public trade information systems. The system of the invention can also include or be interconnected with a Web server or a secured private network to communicate quotations and trade information with client counterparties. The quoting service and other functions can be implemented by means of a computer program product or computer program instructions and appropriate servers or other computing platforms.

DETAILED DESCRIPTION

The present invention will now be described in terms of specific, example embodiments. It should be understood that the invention is not limited to the example embodiments disclosed. It should also be understood that not every feature of the methods and systems described is necessary to implement the invention as claimed in any particular one of the appended claims. Various elements and features of various embodiments are described in order to fully enable the invention.

Throughout this disclosure, where a process or method is shown or described, the steps or subprocesses of the method or methods may be performed in any order or simultaneously, unless the contrary is clear from the context, or is expressly stated. Also, time lapses can occur between steps, and can vary in length. It should also be understood that with respect to flowcharts, block diagrams, and signal flows, not every possible flow, path, or structure is shown. Rather, for clarity, only those flows and structures important to the inventive concepts being discussed may be illustrated, even though others flows and structures may be discussed within this disclosure.

The reader may be aided by an initial understanding of some of the terminology used in this disclosure. The meaning of other terms and phrases are as would be understood in the relevant arts, or will be made clear as terms are used. Throughout this disclosure, extensive use is made of the term "quote" and "quotation" as well as related terms. This term is meant to have essentially the same meanings that would be understood by those of ordinary skill in the art. However, it is important to recognize that securities quotes can take many forms. The specific price of a transaction security can be considered a quote or quotation, however, quotes can also take the form of two, per share prices, a bid price, and an ask price. The two quotes together are often called the "spread" and the terms quote and quotation are meant to encompass all forms of this type of a quote.

References also made herein to a "customized quote," a "customized quotation," or the like. Such terminology is meant to refer to the types of quotes and quotations produced using an embodiment of the invention, that is, quotation that is designed to facilitate a dealer's operations in trading large blocks of securities. Such a customized quote may be different than public quotes for a given security at any given time. A customized quote of this nature is designed for a specific trade with specific counterparties, and may be further customized for a specific time of day or customer, as will be made clear in the discussions of the example embodiments herein. Note that references are also made herein to a "raw quote" and the like. Such a term is meant to refer to a potentially intermediate value or quotation that is used in the process of establishing the customized quote that may be provided using an embodiment of the invention.

At several places within this disclosure, the use of "historical characteristics" of a security is discussed. This term is meant to encompass any and all data of historical nature with regard to a security involved in a transaction. It can also encompass any time period. For example, in example embodiments of the invention, the average spread of a security over the five days previous to a transaction is one of the historical characteristics of a security that can be taken into account. However, other characteristics including information related to liquidity and volatility can also be used. Characteristics can include those that are related to specific clients, and the specific dealer who is facilitating the transaction. This term is meant to encompass any and all possibilities in this regard.

It is important to note that terms such as "dealer" and "security" are intended in their broadest sense possible. For example, a dealer may not necessarily be a traditional stock broker, but can include banks, credit unions, and any other parties that facilitate trading and securities. A "security" can be anything that can be traded in any fashion resembling the way stocks are traditionally traded. For example, a security may be a mutual fund, a commodity, shares of real estate, or any other type of investment vehicle.

Figure 1:
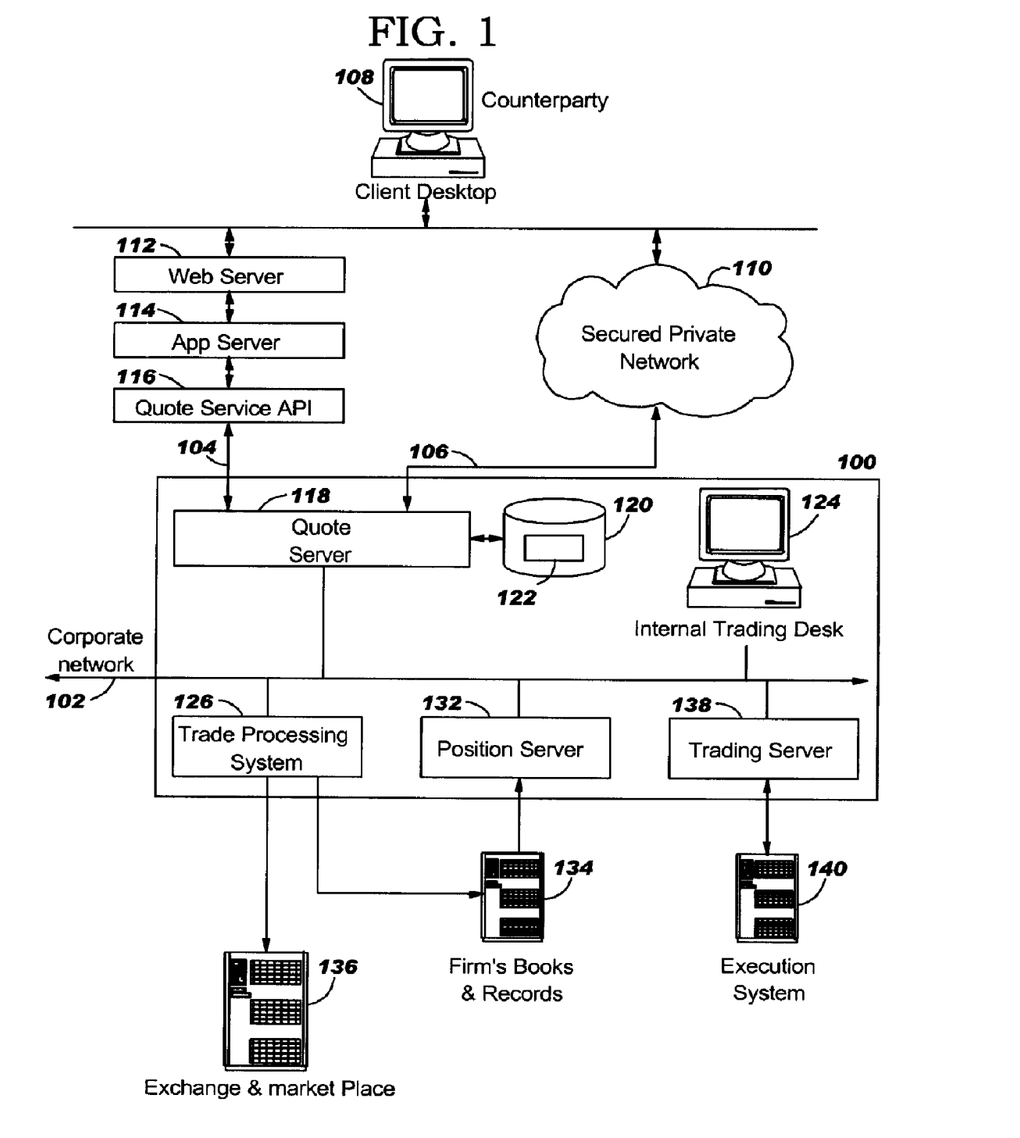
FIG. 1 is a functional block diagram that shows the system, network, and operating environment of example embodiments of the invention.

FIG. 1 illustrates the system and operating environment of example embodiments of the invention. FIG. 1 includes a block trading system ("BTS"), 100. In this example, system 100 is interconnected with network 102, which is the enterprise network of the dealer or brokerage which is making use of the invention. Network interfaces 104 and 106 provide connectivity via the World-Wide-Web, or a secured private network, respectively. In the system of FIG. 1, any number of clients, end users, or counterparties to a transaction can access BTS 100 from desktop computer systems 108. Access can be via secured private network 110, or via Web server 112.

In order to facilitate connectivity between Web server 112 and BTS 100, in this embodiment, an application server, 114 and a quote service application programming interface (API), 116 are deployed behind Web server 112. Clients or counterparties desirous of obtaining indicative prices at which the dealer is willing to trade blocks of a security must enter only certain basic information in the example embodiments presented herein. This information may consist of, for example, the ticker symbol of the security of interest and the size of the block. The system may be operated so that, in order to maintain market neutrality, the client need not indicate whether he or she is seeking to buy or sell.

A quote service is an element of the BTS that is programmed with a series of algorithms or processes that take into account a large variety of pricing factors, allowing the system to instantly provide prices consistent with the dealer's willingness to commit capital. In example embodiments, these customized price quotations take into account the specific point in time and the dealer's risk for a given size transaction, customer class, or trading history. In this example embodiment, the quote service is implemented by a combination of quote server 118, storage medium 120, and computer program code instructions 122, which when loaded into the quote server enable the server to provide the means to carry out the pricing and other algorithms of the invention.

Note that with traditional market makers, prices are displayed broadly and are generally available to all simultaneously. Prices with traditional market makers are also not typically the result of a specific request for a price of a specific block size of a security. As a result, such prices may not be the most aggressive, since dealers must price into them some degree of adverse selection. Also, such prices often do not necessarily reflect an immediate demand by any specific counterparty. In contrast, BTS 100 of the example embodiments of the invention works in the reverse. Prices are for larger orders, and only generated when there is a specific demand for a specific size block from a specific counterparty.

Upon receipt of the necessary information from the requesting client or counter-party, quote server 118 in this example embodiment generates and delivers through the network a two-sided indicative bid and offer representing the price or prices that the dealer is willing to trade at. This offer in these examples is produced in direct response to the specific counterparty's request. These customized, indicative price quotations are not displayed in the public quote stream, and based on the nature of how they are requested and calculated, do not lend themselves to such existing distribution channels. Thus, BTS 100 can automate the one-on-one communications that typically take place when institutional customers inquire of dealers using verbal, or phone based communications.

In some embodiments, or for some customers, a client, upon receiving a customized quotation, can or will still phone a trading desk to consummate the transaction. Thus, internal trading desk platform 124 is provided, and is interconnected with the BTS and the corporate network of FIG. 1. Alternatively, the client counter-party may order the execution of a trade electronically, in a manner similar to the way some trades are conducted using on-line trading services. In either case, the trade is booked by trade processing system 126. Position server 132 is operatively connected to the other elements through the internal network. Position server 132 updates the dealer firm's books and records 134 and maintains proprietary position information for the dealer. This position information can additionally be used in the quote service algorithm, as will be discussed in detail later with respect to FIGS. 3 and 4. The price and size of the trade is reported to the exchange and possibly other entities in the marketplace, 136, by trade processing system 126. The trade is executed by trading server 138, in conjunction with execution system 140.

It should be noted that quote server 118, trade processing system 126, or a combination of the two, or other means, can implement various checks on both the quotation request, and trade execution orders. These can consist of a variety of automated validations or checks against various business logic rules or parameters. For example, credit limits per client can be automatically maintained and enforced, as well as regulatory or other business limits on the transactions. These limits might include precluding executions and certain securities that may be on a restricted list, or subject to a trading halt by the primary marketplace.

To implement the various entities in BTS 100 of FIG. 1, individual servers or instruction execution platforms can be used. However, the various elements should be thought of more as entities than as actual pieces of hardware. Thus, various elements could be combined in a single hardware platform. Alternatively, some of the elements could be implemented by computer program code which is added to existing processing platforms used in a dealer or brokerage for normal trading activities. Some of the entities can maintain databases of information for use by both the quote service, and a dealer's other systems. For example, the position server is essentially a database that maintains the dealer's position or number of shares in each security that is traded. The database can also include other information, such as historical prices. The position server is typically updated in real time and as previously mentioned, can be used to supply position information for use in generating customized quotes according to embodiments of the invention as well as for other purposes. With respect to block trades according to embodiments of the invention, a dealer will want to price a security so that the security is more likely to sell if the dealer's position is such that the dealer is too heavily invested in the particular security at the present time.

In the example of FIG. 1, trade processing system 126 is a server or element that is involved in booking transactions, including account processing and clearance settlement functions. The trading server, 138, can be what is commonly referred to as an order management system. The trading server can serve as a staging area for affecting trades using various strategies designed to liquidate positions cost effectively. In many cases, these various entities may be implemented in a single computer system. Such a computer system could also even house Web services and application services related to presenting on-line information to, and receiving input from requesting counterparties. It cannot be over-emphasized that the line between the various entities above might be blurred in an actual, practical implementation of the invention.

Figure 2:
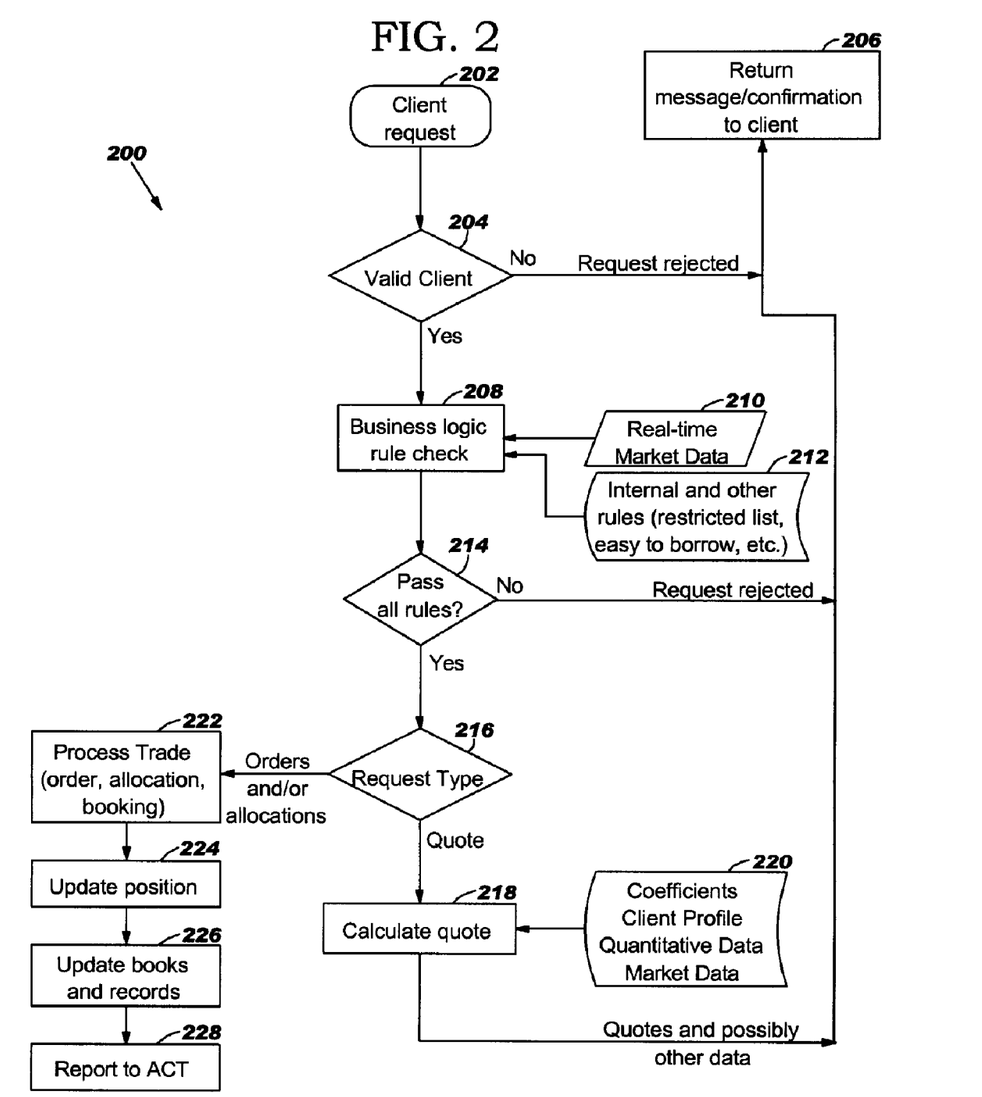
FIG. 2 is a flowchart that illustrates the process of handling block quoting and trading according to an embodiment of the invention.

FIG. 2 illustrates the overall operation of a system like that shown in FIG. 1, this time in flowchart form. As is typical with flow charts, the various steps or subprocesses are presented as a series of process blocks. Process 200 begins with a client request, block 202. At block 204, a check is made as to whether the client attempting to use the system is in fact a valid client of the dealer. If not, processing branches to block 206 where an appropriate message is returned to the client. If so, the client request can be verified against a plurality of business logic rules at block 208. Depending on the rules chosen, real-time market data, 210, as well as specific internal rules and parameters which are garnered from various internal resources, as shown at block 212, can also be used. These internal parameters may come from restricted stock lists, easy to borrow lists, and the like. A check is made at block 214 as to whether the request passes all of the business logic rules. If not, processing branches back to block 206, where an appropriate message is generated to the client or prospective counterparty. If so, processing continues, to a check of the type of request at block 216.

Where a prospective counterparty has initiated process 200 to receive a customized quote, processing at block 216 branches to block 218, where the quote service of the BTS is engaged to generate the customized quote. The quote service can make use of various coefficients, client profile data, quantitative data regarding positions in the stock, and market data, historical and otherwise, as shown at block 220. The customized quote is then returned to the client at messaging block 206.

In the present example, if the client initiates a request to execute a trade or allocation based on a customized quote, processing at block 216 branches to block 222, where the trade is processed, including order, allocation, and booking. The firm's position is updated on the position server at block 224. The books and records are updated at block 226. At block 228, the relevant market systems are provided with information on the trade. In this particular example, the trade is reported to the automated confirmation transaction ("ACT") system, which is operated by the Nasdaq Stock Market, Inc. In the United States, every equity security transaction must be reported through ACT if it takes place off an exchange such as the New York Stock Exchange. ACT serves as an audit trail for regulators, and also provides a source for data used to publish market pricing for completed trades on the public "tape".

Note that in the example of FIG. 2, the business logic rule verification process takes place for both a trade request and a quotation request. It cannot be overemphasized that this is but an example embodiment, both in terms of the types of business logic rules used, and in terms of when they are applied. The system of the invention is intended to be highly customizable for a particular dealer or other facilitator of block trades. The following are but examples of business logic rules that can be used to verify requests to the system. The availability of various needed parameters can be checked. For example, pricing, average daily value, and real-time data that is not stale. A rule can be added to insure the trading in a particular security is not halted. Checks on the quantity of security can be made, for example, that it is above a minimum block quantity or minimum block notional. The quantity available from a stock loan can be checked. A maximum per quote limit can be set on the percent of average daily value, and that limit can be enforced. Various thresholds can be checked and set relative to the position of the dealer that is facilitating the trade. A check can be made to insure that the quantity of securities requested in the block does not exceed the maximum available shares. The previous list presents possibilities over and above the typical programmatic considerations for non-zero quantities, non empty ticker symbols, valid formats, etc.

Figure 3:
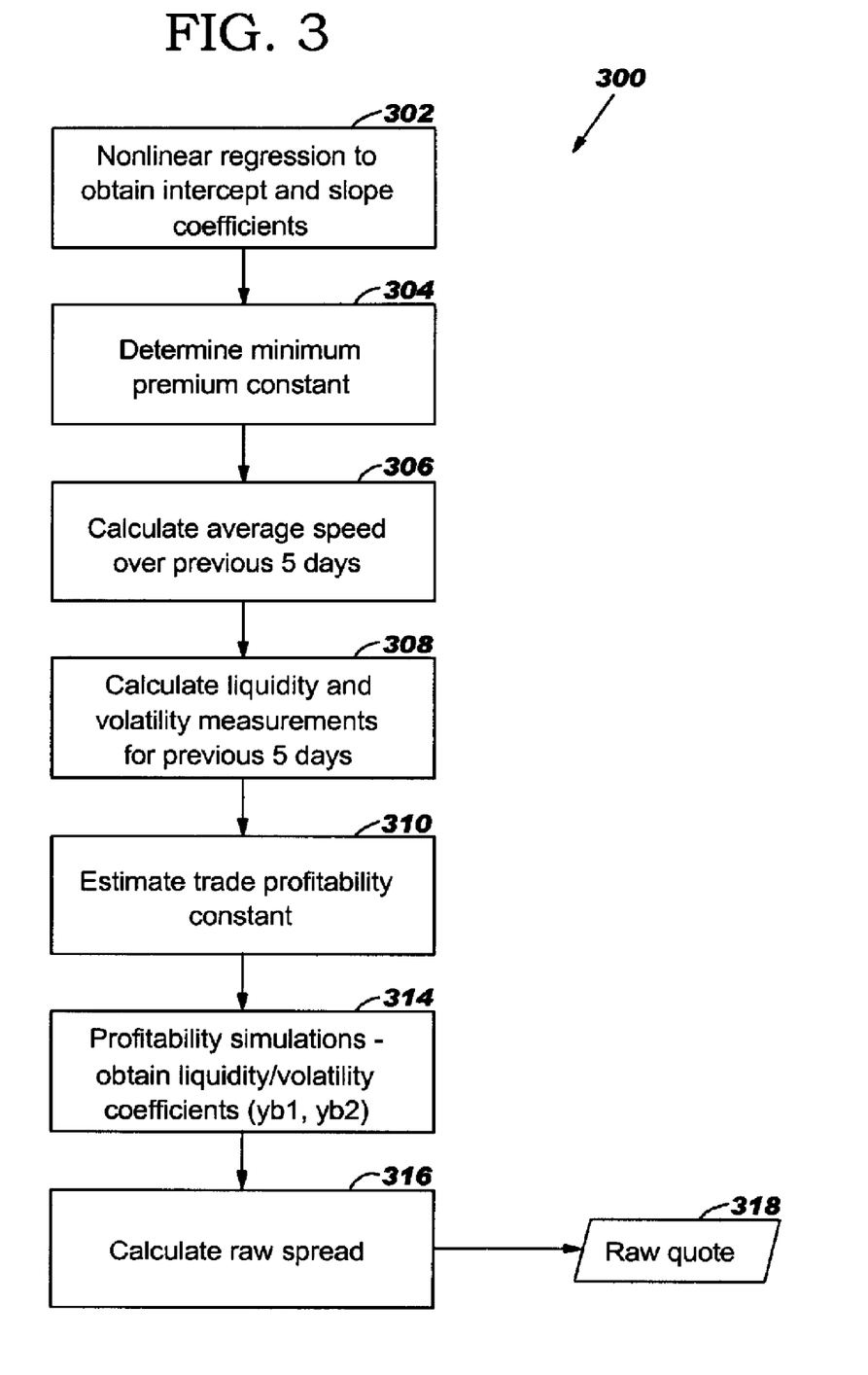
FIG. 3 is a flowchart that illustrates a portion of the process of producing a quotation according to example embodiments of the invention.
Figure 4:
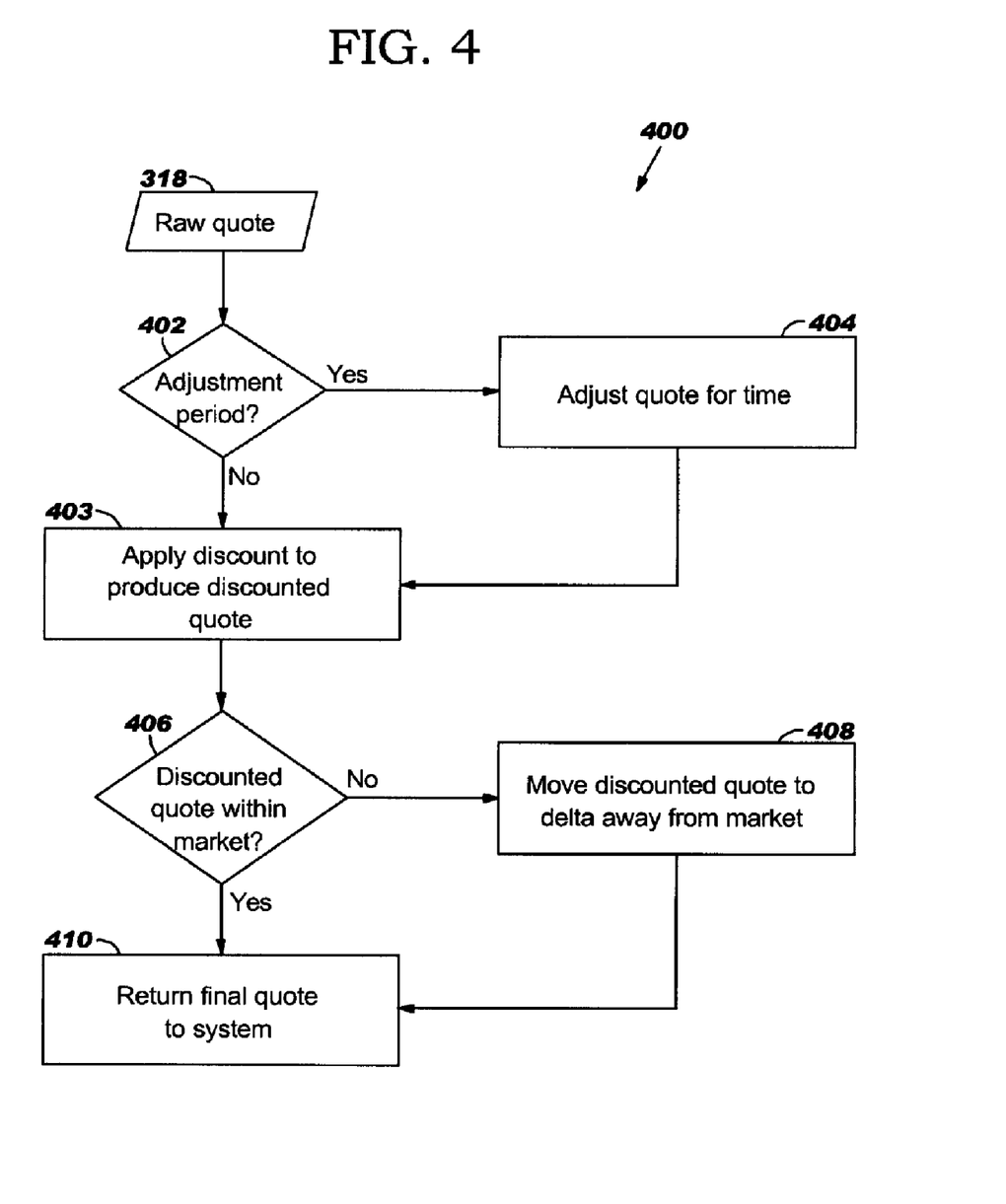
FIG. 4 is a flowchart that illustrates another portion of the process of producing a quotation according to example embodiments of the invention.

FIGS. 3 and 4 illustrate the operation of an example quoting service. As before, the process is illustrated as a series of subprocesses or process blocks. In this particular example, FIG. 3 illustrates the production of what is termed a "raw quote" and FIG. 4 illustrates the adjustment of that quote to produce a final, customized quote. It should be noted that this is an example embodiment only, and in fact, a pricing algorithm can be implemented in which what corresponds to the raw quote in FIG. 3 is in fact the final, customized quote. Process 300 begins at block 302, where a regression analysis is performed to obtain slope and intercept coefficients ($\alpha$, $\beta$) for the pricing function for every stock. The non-linear, robust regression is set up with the log of the return as a dependent variable and money flow as an independent variable. At block 304 a premium constant ($\mu$) is established. This constant determines the minimum premium to be charged in a transaction. This constant may be preselected when the quoting service is set up, or may be determined based on the requesting client or other factors.

At block 306, the average spread ($\sigma$) for the security of interest, as measured over the previous five days of tick data, is calculated by the following equation.

$$\sigma = \frac{1}{N} \sum_n (ask_n - bid_n)$$

At block 308, a calculation is performed to determine the volatility of the stock, as well as an intermediate coefficient related to the liquidity of the stock. The following equations return these values.

$$hl = \frac{1}{2} \sum_{i=1}^{i=5} (high_i + low_i)$$

$$\gamma = \frac{\sum_{i=1}^{i=5} \left| \ln\left(\frac{s_i}{s_{i-1}}\right) \right|}{\sum_{i=1}^{i=5} s_i \cdot V_i}$$

where hl is the volatility, $\gamma$ is the coefficient related to liquidity, $s_i$ is the closing price, and $V_i$ is the volume on day i.

Again, these measurements are designed in this example to take into account the previous five days of tick data. It should be noted that with respect to these measurements, as well as the average spread, the five day window being used is but an example only. One of ordinary skill in the art can design a pricing algorithm that takes into account other amounts of data using other historical windows. Again, historical characteristics of a security can be customized for the particular application of the quoting service.

At block 310 in this example, a client specific constant ($\delta$) is estimated, where the constant is indicative of the historical profitability of trades for the particular counter-party or client. At block 314, profitability simulations are run to obtain liquidity and volatility coefficients ($yb_1$ and $yb_2$) to be used in the pricing function.

At this point, the intercept, slope, and coefficients of a pricing function are complete and the following equation calculates a current raw spread at block 316.

$$bid, ask = s \mp \left[ yb_1 \cdot \left( \max(s \cdot (\alpha + \max(\beta, 10^{-6}) \cdot \sqrt{(\varphi \cdot s)}), \mu) + \frac{1}{2} \cdot s \cdot \sigma \right) + yb_2 \cdot s \cdot (\gamma \cdot \varphi \cdot s + hl \cdot (2 \cdot \delta - 1)) \right]$$

Finally, the raw quote (or possibly the final, customized quote) is produced at block 318.

FIG. 4 illustrates how a quote produced by the process illustrated in FIG. 3 can be adjusted for time, or to apply a discount. Raw quote 318, from FIG. 3, serves as the input to process 400 of FIG. 4. At block 402, a check is made as to whether an adjustment is required based on the time of day. In example embodiments of the invention, the raw spread can be adjusted to be more aggressive as the day goes on based on a linear function that grows from a starting value to a final value during the adjustment period. The function remains constant at the final value after the adjustment period. For example, the adjustment period can begin one hour after quoting starts at the beginning of the day, and could proceed until quoting ends. If the quote is being provided outside of the adjustment period, processing proceeds next to the next block, block 403, where a discount can be provided. If the quote is being supplied during the adjustment period, processing proceeds instead to block 404, where the quote is adjusted for time. For example, the raw spread can be multiplied by the value of a linear function that proceeds from 1.0 to 1.4. Thus, the quote is adjusted for time under the assumption that as the day goes on, there will be less and less opportunities to liquidate a position in a security at a given price, and more opportunities if the price is discounted.

Turning again to block 403, the discount can be applied to the raw or time adjusted quote depending on the processing in blocks 402 and 404. This discount can be applied based on the dealer's position in the security. For example, if the dealer is long on the stock, the offer can be discounted. Otherwise, the bid can be discounted. There are numerous ways this discount could be calculated and applied. As another example, a percent of the requested quantity in the dealer's favor can be calculated. Note that the way process 400 of FIG. 4 is presented, zero percent is a possible discount, effectively resulting in a customized quotation that is not discounted from the time adjusted or raw quote.

At block 406 in the example of FIG. 4, the discounted quote is checked against a configurable threshold from the market bid or ask price. If the discount exceeds this threshold, it is considered to be not within the market, and processing proceeds to where the discounted quote is then moved to a specified delta away from the market price at block 408. This delta may be the same as the threshold. If the discounted quote is within the market, processing proceeds to block 410, where the final quote is produced. In the example embodiments disclosed herein, this final quote is the customized quotation provided for a particular block quantity of a security at a particular time. However, the production of the final quote at block 410 can include rounding to the nearest penny, or rounding within a configurable delta, as well as additional checks and verifications to make sure that the pricing algorithm has operated properly. The customized quotation is then returned to the client or counterparty in the manner previously described with respect to FIGS. 1 and 2.

It should be noted that in example embodiments, the quote service and other aspects of the system of the invention are highly configurable and customizable. As such, the production of the final quote for the system, discussed above with respect to FIG. 4, can include a plurality of parameters that are superimposed on the quote after the pricing function is run. If one of these parameters fails, or creates a problem, the process can be interrupted, an appropriate message can be returned to the client, and dealer personnel or another system can intervene. For example, global parameters could include, but are not limited to, a maximum dollar value for a quote, or a maximum percentage of the average daily volume in the particular stock. Other examples include a threshold for disabling stock in a fast market, a window for disabling stock in a fast market, and parameters related to timing. Timing parameters might include starting values for a time component of a quote, particular amounts of time before or after certain market events at which quoting is to be halted, and the like.

As previously discussed, the present invention, as described in example embodiments, can be implemented via computer platforms or instruction execution platforms, networks, and computer program code instructions. The computer program code instructions can take the form of a computer program product residing on a computer usable or computer readable storage medium. An example of such a medium is storage medium 120 of FIG. 1, on which instructions 122 for the pricing algorithm reside. Storage medium 120 is schematically represented as a fixed storage medium, but such a medium could be removable. In fact, removable "hard disks" are readily available for use with servers, desktop, and laptop personal computers. A removable storage medium might also store computer program code instructions optically, such as in the case of a CD ROM, or on traditional, removable, lower capacity magnetic storage mediums such as diskettes or so-called "zip" disks. A computer program product containing the program instructions can be supplied in such a form, and loaded onto servers or other systems involved, either directly, or over a network. Such computer program instructions, also commonly referred to as "software" direct the operation of the computing platforms or instruction execution platforms involved to cause them to carry out processes of embodiments of the invention. The "medium" can also simply be a stream of information being retrieved when a computer program product is "downloaded" through the internet.

Computer programs can reside on any medium that can contain, store, communicate, propagate, or transport the computer software program for use by or in connection with any apparatus, system, or device. Note that the computer usable or computer readable medium can even be paper or another suitable medium on which the instructions are printed. In such a case, the program can be electronically captured via optical scanning of the paper or other medium, then processed in a suitable fashion.

Specific embodiments of an invention are described herein. One of ordinary skill in the computing, networking and financial arts will quickly recognize that the invention has other applications and other environments. Many embodiments and implementations are possible. The following claims are in no way intended to limit the scope of the invention to the specific embodiments described.

What is claimed is:

1. A method of trading a block of a security comprising:
formulating, using a quote server, an automated, two-sided customized quote for a specific trade for the block in response to a request from a prospective counterparty, the automated, two-sided, customized quote being based on at least a size of the block and at least one historical characteristic of the security;
delivering the automated, two-sided, customized quote to the prospective counterparty via a network;
accepting, over the network, at a trade processing system, an order to trade the block of the security based on the automated, two-sided, customized quote; and
executing the specific trade in the trade processing system based on the order and the automated, two-sided, customized quote.

2. The method of claim 1 further comprising verifying the request using at least one of the quote server and the trade processing system against a plurality of business logic rules.

3. The method of claim 1 wherein the at least one historical characteristic is chosen from average spread, liquidity, volatility, or combinations thereof.

4. The method of claim 2 wherein the at least one historical characteristic is chosen from average spread, liquidity, volatility, or combinations thereof.

5. The method of claim 3 wherein the formulating of the automated, two-sided, customized quote further comprises:
calculating, using the quote server, a raw quote based on the at least one historical characteristic; and
determining, using the quote server, the automated, two-sided, customized quote from the raw quote by at least one of, applying an adjustment based on a time of day, and applying a discount based on a current position in the security.

6. The method of claim 4 wherein the formulating of the automated, two-sided, customized quote further comprises:
- calculating, using the quote server, a raw quote based on the at least one historical characteristic; and
- determining, using the quote server, the automated, two-sided, customized quote from the raw quote by at least one of, applying an adjustment based on a time of day, and applying a discount based on a current position in the security.

7. Apparatus for trading a block of a security comprising:
- means for producing an automated, two-sided, customized quote for a specific trade for the block in response to a request from a prospective counterparty, the, automated, two-sided, customized quote being based on at least a size of the block and at least one historical characteristic of the security; and
  - means for accepting an order for the specific trade of the block of the security based on the automated, two-sided, customized quote.

8. The apparatus of claim 7 further comprising means for verifying the request against a plurality of business logic rules.

9. The apparatus of claim 7 further comprising:
- means for calculating a raw quote based on the at least one historical characteristic; and
- means for determining the automated, two-sided, customized quote from the raw quote by at least one of, applying an adjustment based on a time of day, and applying a discount based on a current position in the security.

10. The apparatus of claim 8 further comprising:
- means for calculating a raw quote based on the at least one historical characteristic; and
  - means for determining the automated, two-sided, customized quote from the raw quote by at least one of, applying an adjustment based on a time of day, and applying a discount based on a current position in the security.

11. A system for facilitating trading of block quantities of securities, the system comprising:
- a computer-executable program tangibly embodied on a computer readable medium to cause a quote service to provide automated, two-sided, customized, current quotes to prospective counterparties, an automated, two-sided, customized, current quote for a specific trade and based at least in part on a specified size of a block of a specified security as well as at least one historical characteristic of the specified security; and
- a trade processing system to execute trades, the specific trade of the block of the specified security being executed based on the automated, two-sided, customized, current quote.

12. The system of claim 11 further comprising a position server operatively connected to the quote service and the trade processing system to maintain position information for the system, wherein the automated, two-sided, customized, current quote is also based in part on a discount that depends on a current position in the specified security.

13. The system of claim 11 wherein the at least one historical characteristic is chosen from average spread, liquidity, volatility, or combinations thereof.

14. The system of claim 12 wherein the at least one historical characteristic is chosen from average spread, liquidity, volatility, or combinations thereof.

15. The system of claim 12 wherein the automated, two-sided, customized, current quote is further based on a time of day.

16. The system of claim 13 wherein the automated, two-sided, customized, current quote is further based on a time of day.

17. The system of claim 11 further comprising an interface operable to provide the automated, two-sided, customized, current quote to a prospective counterparty through a Web server.

18. The system of claim 12 further comprising an interface operable to provide the automated, two-sided, customized, current quote to a prospective counterparty through a Web server.

19. The system of claim 13 further comprising an interface operable to provide the automated, two-sided, customized, current quote to a prospective counterparty through a Web server.

20. The system of claim 14 further comprising an interface operable to provide the automated, two-sided, customized, current quote to a prospective counterparty through a Web server.

21. The system of claim 15 further comprising an interface operable to provide the automated, two-sided, customized, current quote to a prospective counterparty through a Web server.

22. The system of claim 16 further comprising an interface operable to provide the automated, two-sided, customized, current quote to a prospective counterparty through a Web server.

23. A method of producing an automated, two-sided, customized quotation to facilitate a specific trade of a block quantity of a security, the method comprising:
- running a regression analysis on a quote server to establish slope and intercept values for a function;
- calculating, on the quote server, at least one historical characteristic of the security;
- determining, on the quote server, coefficients for the function based at least in part on a profitability simulation; and
- producing, at the quote server, the automated, two-sided, customized quotation for the specific trade from the function using the slope and intercept values, the coefficients, the block quantity, and the at least one historical characteristic of the security.

24. The method of claim 23 further comprising adjusting, at the quote server the automated, two-sided, customized quotation based on: a time of day, a discount based on a current position in the security, or both.

25. The method of claim 23 wherein the at least one historical characteristic is chosen from average spread, volatility, liquidity, or combinations thereof.

26. The method of claim 24 wherein the at least one historical characteristic is chosen from average spread, volatility, liquidity, or combinations thereof.

27. The method of claim 25 further comprising establishing, at the quote server, a minimum premium to be charged for the specific trade, and wherein the producing of the automated, two-sided, customized quotation is further accomplished using the minimum premium.

28. The method of claim 27 further comprising establishing, at the quote server, a client-specific profitability constant, wherein the producing of the automated, two-sided, customized quotation is further accomplished using the client-specific profitability constant.

29. The method of claim 26 further comprising establishing, at the quote server, a minimum premium to be charged for the specific trade, and wherein the producing of the automated, two-sided, customized quotation is further accomplished using the minimum premium.

30. The method of claim 29 further comprising establishing, at the quote server, a client-specific profitability constant, wherein the producing of the automated, two-sided, customized quotation is further accomplished using the client-specific profitability constant.

31. Apparatus for producing automated, two-sided, customized quotations to facilitate trading of block quantities of securities, the apparatus comprising:
   means for establishing a pricing function for a block quantity of a security;
   means for calculating at least one historical characteristic of the security; and
   means for producing an automated, two-sided, customized quotation for a specific trade from the pricing function using the block quantity for the security, and the at least one historical characteristic of the security.

32. The apparatus of claim 31 further comprising means for adjusting the automated, two-sided, customized quotation based on: a time of day, a discount based on a current position in the security, or both.

33. The apparatus of claim 31 further comprising means for establishing a minimum premium to be charged for the specific trade, the minimum premium to be used in producing the automated, two-sided, customized quotation.

34. The apparatus of claim 33 further comprising means for establishing a client-specific profitability constant to be used in producing the automated, two-sided, customized quotation.

35. The apparatus of claim 32 further comprising means for establishing a minimum premium to be charged for the specific trade, the minimum premium to be used in producing the automated, two-sided, customized quotation.

36. The apparatus of claim 35 further comprising means for establishing a client-specific profitability constant to be used in producing the automated, two-sided, customized quotation.

37. A computer-executable program tangibly embodied on a computer readable medium, which, when executed by a computer produces automated, two-sided, customized quotations to facilitate trading of block quantities of securities, comprising:
   running a regression analysis to establish slope and intercept values for a function;
   calculating at least one historical characteristic of a security;
   determining coefficients for the function based at least in part on a profitability simulation; and
   producing an automated, two-sided, customized quotation for a specific trade from the function using the slope and intercept values, the coefficients, a block quantity for the security, and the at least one historical characteristic of the security.

38. The computer executable program of claim 37 further comprising adjusting the automated, two-sided, customized quotation based on: a time of day, a discount based on a current position in the security, or both.

39. The computer executable program of claim 37 wherein the at least one historical characteristic is chosen from average spread, volatility, liquidity, or combinations thereof.

40. The computer executable program of claim 38 wherein the at least one historical characteristic is chosen from average spread, volatility, liquidity, or combinations thereof.

41. The computer executable program of claim 37 further comprising establishing a minimum premium to be charged for the specific trade, and wherein the producing of the automated, two-sided, customized quotation is further accomplished using the minimum premium.

42. The computer executable program of claim 37 further comprising establishing a client-specific profitability constant, wherein the producing of the automated, two-sided, customized quotation is further accomplished using the client-specific profitability constant.

43. The computer executable program of claim 37 further comprising establishing a minimum premium to be charged for the specific trade, and wherein the producing of the automated, two-sided, customized quotation is further accomplished using the minimum premium.

44. The computer executable program of claim 37 further comprising establishing a client-specific profitability constant, wherein the producing of the automated, two-sided, customized quotation is further accomplished using the client-specific profitability constant.

* * * * *

UNITED STATES PATENT AND TRADEMARK OFFICE
CERTIFICATE OF CORRECTION

PATENT NO. : 7,685,038 B2  
APPLICATION NO. : 10/711889  
DATED : March 23, 2010  
INVENTOR(S) : Ross L. Stevens, George S. Corey, Jr. and Vlad Portnoy It is certified that error appears in the above-identified patent and that said Letters Patent is hereby corrected as shown below:

On the title page item (75), the name of the third inventor reading "Vkad Portnoy" should read --Vlad Portnoy--.

Signed and Sealed this

Eleventh Day of May, 2010

David J. Kappos  
*Director of the United States Patent and Trademark Office*